(12) United States Patent
Tang

(10) Patent No.: US 11,582,596 B2
(45) Date of Patent: Feb. 14, 2023

(54) METHOD FOR UPDATING POLICY INFORMATION, NETWORK DEVICE AND TERMINAL DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 191 days.

(21) Appl. No.: 16/983,601

(22) Filed: Aug. 3, 2020

(65) Prior Publication Data

US 2020/0367052 A1 Nov. 19, 2020

Related U.S. Application Data

(63) Continuation of application No. 16/709,885, filed on Dec. 10, 2019, now Pat. No. 10,771,962, which is a (Continued)

(30) Foreign Application Priority Data

| Feb. 9, 2018 | (WO) | ................ | PCT/CN2018/076013 |
| Mar. 7, 2018 | (WO) | ................ | PCT/CN2018/078330 |
| Mar. 15, 2018 | (WO) | ................ | PCT/CN2018/079203 |

(51) Int. Cl.
*H04L 12/28* (2006.01)
*H04W 8/24* (2009.01)
(Continued)

(52) U.S. Cl.
CPC ............. *H04W 8/24* (2013.01); *H04M 15/66* (2013.01); *H04W 8/183* (2013.01); *H04W 8/205* (2013.01); *H04W 48/18* (2013.01); *H04W 84/042* (2013.01)

(58) Field of Classification Search
CPC .... H04L 41/0894; H04W 8/22; H04W 48/18; H04W 84/042
(Continued)

(56) References Cited

U.S. PATENT DOCUMENTS

| 8,977,303 B2 | 3/2015 | Fang et al. |
| 2002/0114315 A1 | 8/2002 | Kangas |

(Continued)

FOREIGN PATENT DOCUMENTS

| CN | 1559131 A | 12/2004 |
| CN | 101365230 A | 2/2009 |

(Continued)

OTHER PUBLICATIONS

Communication pursuant to Article 94(3) EPC for EP Application 18905239.2 dated Nov. 18, 2020.
(Continued)

*Primary Examiner* — John Pezzlo
(74) *Attorney, Agent, or Firm* — Young Basile Hanlon & MacFarlane, P.C.

(57) ABSTRACT

Provided are a wireless communication method, a network device and a terminal device. The method includes: after acquiring a PSI parameter of a terminal device, a first network device determines whether to update policy information of the terminal device, wherein the PSI parameter is used for identifying a part of policy information for the terminal device under a subscribed user. In an implementation of the present disclosure, after acquiring a Policy Section Identifier (PSI) parameter of a terminal device, a
(Continued)

first network device directly determines whether to update policy information of the terminal device.

18 Claims, 5 Drawing Sheets

Related U.S. Application Data continuation of application No. PCT/CN2018/109369, filed on Oct. 8, 2018.

(51) Int. Cl.
| | |
|---|---|
| *H04M 15/00* | (2006.01) |
| *H04W 8/18* | (2009.01) |
| *H04W 8/20* | (2009.01) |
| *H04W 48/18* | (2009.01) |
| *H04J 1/16* | (2006.01) |
| *H04W 84/04* | (2009.01) |

(58) Field of Classification Search
 USPC .................................. 370/252, 329, 386
 See application file for complete search history.

(56) References Cited

U.S. PATENT DOCUMENTS

| | | | |
|---|---|---|---|
| 2004/0085951 A1 | 5/2004 | Rezaiifar et al. | |
| 2006/0035637 A1 | 2/2006 | Westman | |
| 2007/0254625 A1* | 11/2007 | Edge .................. | H04M 7/0078 455/404.1 |
| 2015/0126156 A1 | 5/2015 | Sauder et al. | |
| 2017/0222991 A1 | 8/2017 | Yang | |
| 2017/0366311 A1* | 12/2017 | Iyer ..................... | H04B 7/0617 |
| 2020/0007200 A1* | 1/2020 | Schreck ............... | H04B 7/0417 |
| 2020/0280948 A1* | 9/2020 | Youn .................... | H04W 76/12 |

FOREIGN PATENT DOCUMENTS

| | | |
|---|---|---|
| CN | 101478796 A | 7/2009 |
| CN | 103379479 A | 10/2013 |
| CN | 103702377 A | 4/2014 |
| CN | 104349269 A | 2/2015 |
| CN | 105491566 A | 4/2016 |
| CN | 105814540 A | 7/2016 |
| CN | 106068016 A | 11/2016 |
| CN | 107770815 A | 3/2018 |
| EP | 3624395 A1 | 3/2020 |
| JP | 2012138702 A | 7/2012 |
| JP | 2017517227 A | 6/2017 |
| KR | 20030094230 A | 12/2003 |
| RU | 2428817 C2 | 9/2011 |
| TW | 201631931 A | 9/2016 |
| WO | 2006018480 A2 | 2/2006 |
| WO | 2016019559 A1 | 2/2016 |

OTHER PUBLICATIONS

Australian Examination Report for AU Application 2018408054 dated Sep. 2, 2021. (3 pages).
Japanese Office Action with English Translation for JP Application 2020513637 dated Aug. 27, 2021. (8 pages).
Chile Office Action with English Translation for CL Application 2019003773 dated Aug. 23, 2021. (20 pages).
Chile Office Action with English Translation for CL Application 2019003773 dated Jun. 18, 2021. (20 pages).
Indian Examination Report for IN Application 201917054315 dated Jul. 15, 2021. (5 pages).
Korean Office Action with English Translation for KR Application 2020-7006586 dated May 7, 2021. (10 pages).
Canadian Examination Report for CA Application 3065119 dated Dec. 23, 2021. (4 pages).
Extended European Search Report for EP Application 21191084.9 dated Nov. 2, 2021. (12 pages).
Indonesia Office Action with English Translation for ID Application P00201912516 dated Oct. 23, 2021. (11 pages.
3GPP TS 23.503 V15.0.0 (Dec. 2017), Policy and Charging Control Framework for the 5G System;Stage 2(Release 15). (56 pages).
Japanese Office Action with English Translation for JP Application 2020513637 dated Feb. 15, 2022. (4 pages).
Australian Notice of Acceptance for AU Application 2018408054 dated Mar. 1, 2022. (3 pages).
Zaghloul, S.et.al. "Signaling and Handoff Rates at the Policy Control Function (PCF) in IP Multimedia Subsystem (IMS)".
Bouam, S.et al. "A 802.11 Multiservices Cross-Layer Approach for QoS Management".
English translation of International Search report issued in corresponding application No. PCT/CN2018/079203, dated Oct. 31, 2018.
English translation of International Search report issued in corresponding application No. PCT/CN2018/076013, dated Sep. 29, 2018.
SA WG2 Meeting #127 S2-183203; Apr. 16-20, 2018, Sanya, China.
3GPP TSG-SA WG2 Meeting #125;S2-181386; Gothenburg, Sweden, Jan. 22-26, 2018.
SA WG2 Meeting #127; S2-183176; Apr. 16- 20, 2018, Sanya, China.
3GPP TSG-SA WG2 Meeting #125; S2-181399; Gothenburg, Sweden, Jan. 22-26, 2018.
3GPP TSG-SA WG2 Meeting #125;S2-180965; Gothenburg, Sweden, Jan. 22-26, 2018.
3GPP TSG-SA WG2 Meeting #125; Gothenburg, Sweden, Jan. 22-26, 2018; S2-180564.
3GPP TSG-SA WG2 Meeting #125; Gothenburg, Sweden, Jan. 22-26, 2018; S2-180563.
3GPP TS 23.503; 3rd Generation Partnership Project; Technical Specification Group Services and System Aspects; 56 pages.
3GPP TS 23.503; 3rd Generation Partnership Project; Technical Specification Group Services and System Aspects; 258 pages.
Extended EP Search Report for EP application 18905239.2 filed May 14, 2020.
English translation of International Search report issued in corresponding application No. PCT/CN2018/109369, dated Jan. 4, 2019.
Russian Office Action with English Translation for RU Application 2019139729 dated Feb. 2, 2021. (11 pages).
Chile Office Action with English Translation for CL Application 2019003773 dated Feb. 18, 2021. (24 pages).
Canada Office Action for CA Application 3,065,119 dated Feb. 18, 2021. (4 pages).
Taiwan Office Action with English Translation for TW Application 108104175 dated May 10, 2022. (12 pages).

\* cited by examiner

METHOD FOR UPDATING POLICY INFORMATION, NETWORK DEVICE AND TERMINAL DEVICE

CROSS-REFERENCE TO RELATED APPLICATION(S)

The present application is a continuation application of U.S. patent application Ser. No. 16/709,885, filed on Dec. 10, 2019, which is a continuation application of PCT Patent Application No. PCT/CN2018/109369, filed on Oct. 8, 2018, which claims priorities to PCT Patent Application No. PCT/CN2018/076013, filed on Feb. 9, 2018, PCT Patent Application No. PCT/CN2018/078330, filed on Mar. 7, 2018, and PCT Patent Application No. PCT/CN2018/079203, filed on Mar. 15, 2018, the disclosures of all of which are hereby incorporated by reference in their entireties.

TECHNICAL FIELD

Implementations of the present disclosure relate to the communication field, and more particularly, to a wireless communication method, a network device and a terminal device.

BACKGROUND

In the prior art, since a Policy Section Identifier (PSI) parameter of User Equipment (UE) in a plaintext is added into an Initial registration message to be sent to a Policy Control Function (PCF), it is easy to be intercepted by other users, causing potential safety hazards.

For example, UE-2 acquires the PSI parameter of UE-1 through the Registration Request of UE-1 (because the Registration Request is sent in a plaintext), then UE-2 may initiate a registration request carrying the PSI parameter of UE-1, and the network device will send the UE Policy of UE-1 to UE-2, causing potential safety hazards and privacy leaks.

SUMMARY

A wireless communication method, a network device and a terminal device are provided.

In a first aspect, a wireless communication method is provided. The method includes: determining, by a first network device, whether to update policy information of a terminal device after acquiring a Policy Section Identifier (PSI) parameter of the terminal device, wherein the PSI parameter is used for identifying a part of policy information for the terminal device under a subscribed user.

In an implementation of the present disclosure, after acquiring the PSI parameter of the terminal device, the first network device directly determines whether to update the policy information of the terminal device.

In some possible implementation modes, the PSI parameter includes a subscriber identifier.

Determining whether to update the policy information of the terminal device includes: receiving, by the first network device, a subscriber identifier sent by a second network device; and determining, by the first network device, whether to update the policy information of the terminal device according to the subscriber identifier corresponding to the PSI parameter and the subscriber identifier sent by the second network device.

In some possible implementation modes, determining, by the first network device, whether to update the policy information of the terminal device according to the subscriber identifier corresponding to the PSI parameter and the subscriber identifier sent by the second network device, includes: determining, by the first network device, to update the policy information of the terminal device when determining that the subscriber identifier corresponding to the PSI parameter is different from the subscriber identifier sent by the second network device.

In some possible implementation modes, determining to update the policy information of the terminal device includes: sending, by the first network device, policy information corresponding to a subscriber identifier of the terminal device currently used to the terminal device.

In some possible implementation modes, determining to update the policy information of the terminal device includes: sending, by the first network device, policy information corresponding to the subscriber identifier sent by the second network device to the terminal device.

In some possible implementation modes, the subscriber identifier includes a Subscriber Private Identifier (SUPI) and/or a Subscriber Concealed Identifier (SUCI).

In some possible implementation modes, the PSI parameter includes a Public Land Mobile Network (PLMN) identifier and a first identifier, and the first identifier is used for uniquely identifying a PSI parameter under the PLMN.

In some possible implementation modes, the PSI parameter includes a timestamp and/or a version identifier.

Determining whether to update a policy of the terminal device includes: acquiring, by the first network device, a last update time of the policy information of the terminal device according to the timestamp and/or the version identifier in the PSI parameter, and determining whether to update the policy information of the terminal device according to an update time threshold and/or a latest version.

In some possible implementation modes, the method further includes: updating, by the first network device, the policy information of the terminal device when determining to update a policy of the terminal device.

In some possible implementation modes, updating the policy information of the terminal device includes: updating periodically, by the first network device, the policy information of the terminal device.

In some possible implementation modes, updating the policy information of the terminal device includes: sending/updating, by the first network device, part of the policy information to the terminal device according to capability information of the terminal device.

In some possible implementation modes, the capability information includes at least one of the following: a Permanent Equipment Identifier (PEI), a voice support capability of the terminal device, a Radio Frequency Selection Priority (RFSP) parameter of the terminal device, Single-Network Slice Selection Assistance Information (S-NSSAI) reported by the terminal device, whether an operating system supports receiving and/or identifying a Data Network Name (DNN) parameter sent by an application layer, and whether mapping an upper layer request message of 3GPP into a parameter indicating a PDU session characteristic is supported.

In some possible implementation modes, before the first network device updates the policy information of the terminal device according to the capability information of the terminal device, the method further includes: acquiring, by the first network device, the capability information of the terminal device.

In some possible implementation modes, updating the policy information of the terminal device includes: sending, by the first network device, all policy information to the terminal device to enable the terminal device to select part of the policy information to use from the all policy information according to a capability of the terminal device.

In some possible implementation modes, the first network device is a Policy Control Function (PCF).

In some possible implementation modes, the second network device is an Access and Mobility Management Function (AMF).

In a second aspect, a wireless communication method is provided. The method includes: determining, by a terminal device, a Policy Section Identifier (PSI) parameter which is used for identifying a part of policy information for the terminal device under a subscribed user; and sending, by the terminal device, the PSI parameter to a first network device.

In some possible implementation modes, the PSI parameter includes a subscriber identifier.

In some possible implementation modes, the method further includes: receiving, by the terminal device, policy information corresponding to a subscriber identifier of the terminal device currently used, which is sent by the first network device.

In some possible implementation modes, receiving, by the terminal device, the policy information corresponding to the subscriber identifier of the terminal device currently used, which is sent by the first network device, includes: receiving, by the terminal device, the policy information corresponding to a subscriber identifier sent by a second network device.

In some possible implementation modes, the subscriber identifier includes a Subscriber Private Identifier (SUPI) and/or a Subscriber Concealed Identifier (SUCI).

In some possible implementation modes, the PSI parameter includes a Public Land Mobile Network (PLMN) identifier and a first identifier, and the first identifier is used for uniquely identifying a PSI parameter under the PLMN.

In some possible implementation modes, the method further includes: receiving, by the terminal device, the policy information of the terminal device sent by the first network device.

In some possible implementation modes, receiving, by the terminal device, the policy information of the terminal device sent by the first network device includes: receiving periodically, by the terminal device, the policy information of the terminal device sent by the first network device.

In some possible implementation modes, the policy information of the terminal device sent by the first network device is the policy information of the terminal device determined by the first network device according to capability information of the terminal device.

In some possible implementation modes, the capability information includes at least one of the following: a Permanent Equipment Identifier (PEI), a voice support capability of the terminal device, a Radio Frequency Selection Priority (RFSP) parameter of the terminal device, Single-Network Slice Selection Assistance Information (S-NSSAI) reported by the terminal device, whether an operating system supports receiving and/or identifying a Data Network Name (DNN) parameter sent by an application layer, and whether mapping an upper layer request message of 3GPP into a parameter indicating a PDU session characteristic is supported.

In some possible implementation modes, before the terminal device receives the policy information of the terminal device sent by the first network device, the method further includes: sending, by the terminal device, the capability information of the terminal device to the first network device.

In some possible implementation modes, receiving, by the terminal device, the policy information of the terminal device sent by the first network device includes: receiving, by the terminal device, all policy information of the terminal device sent by the first network device; and the method further includes: selecting, by the terminal device, part of the policy information to use from the all policy information according to a capability of the terminal device.

In some possible implementation modes, the first network device is a Policy Control Function (PCF).

In some possible implementation modes, the second network device is an Access and Mobility Management Function (AMF).

In a third aspect, a network device is provided. The network device includes a processing unit, used for determining whether to update policy information of a terminal device after acquiring a Policy Section Identifier (PSI) parameter of the terminal device, wherein the PSI parameter is used for identifying a part of policy information for the terminal device under a subscribed user.

In a fourth aspect, there is provided a network device including: a processor, used for determining whether to update policy information of a terminal device after acquiring a Policy Section Identifier (PSI) parameter of the terminal device, wherein the PSI parameter is used for identifying a part of policy information for the terminal device under a subscribed user.

In a fifth aspect, there is provided a terminal device including: a determining unit, used for determining a Policy Section Identifier (PSI) parameter which is used for identifying a part of policy information for the terminal device under a subscribed user; and a transceiving unit, used for sending the PSI parameter to a first network device.

In a sixth aspect, there is provided a terminal device including: a determiner, used for determining a Policy Section Identifier (PSI) parameter which is used for identifying a part of policy information for the terminal device under a subscribed user; and a transceiver, used for sending the PSI parameter to a first network device.

In a seventh aspect, a wireless communication method is provided. The method includes: determining, by a first network device, that in a registration request message, a Policy Section Identifier (PSI) parameter is not carried or the PSI parameter is null, wherein the PSI parameter is used for identifying a part of policy information for a terminal device under a subscribed user; and sending, by the first network device, policy information to the terminal device.

In an eighth aspect, a wireless communication method is provided. The method includes: sending, by a terminal device, a registration request message to a network device, wherein a Policy Section Identifier (PSI) parameter is not carried or the PSI parameter is null in the registration request message, wherein the PSI parameter is used for identifying a part of policy information for the terminal device under a subscribed user; and receiving, by the terminal device, policy information sent by a first network device.

In a ninth aspect, there is provided a network device including: a processing unit, used for determining that in a registration request message, a Policy Section Identifier (PSI) parameter is not carried or the PSI parameter is null, wherein the PSI parameter is used for identifying a part of policy information for a terminal device under a subscribed user; and a transceiving unit, used for sending policy information to the terminal device.

In a tenth aspect, there is provided a terminal device including: a transceiving unit, used for sending a registration request message to a network device, wherein a Policy Section Identifier (PSI) parameter is not carried or the PSI parameter is null in the registration request message, wherein the PSI parameter is used for identifying a part of policy information for the terminal device under a subscribed user; wherein the transceiving unit is further used for receiving policy information sent by a first network device.

In an eleventh aspect, a computer readable medium is provided for storing a computer program. The computer program includes instructions for executing the method implementations of the above first aspect, the second aspect, the seventh aspect and the eighth aspect.

In a twelfth aspect, there is provided a computer chip, including an input interface, an output interface, at least one processor, and a memory, wherein the processor is used for executing codes in the memory, and when the codes are executed, the processor may implement various processes executed by the first network device in the method implementations of the above-mentioned first aspect, second aspect, seventh aspect, eighth aspect, and various implementation modes.

In a thirteenth aspect, there is provided a computer chip, including an input interface, an output interface, at least one processor, and a memory, wherein the processor is used for executing codes in the memory, and when the codes are executed, the processor may implement various processes executed by the terminal device in the method implementations of the above-mentioned first aspect, second aspect, seventh aspect, eighth aspect, and various implementation modes.

In a fourteenth aspect, there is provided a communication system including the aforementioned first network device and terminal device.

DETAILED DESCRIPTION

Technical solutions in implementations of the present application will be clearly and completely described below with reference to the drawings in the implementations of the present application.

It should be understood that the technical solutions of the implementations of the present application may be applied to various communication systems, such as, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Time Division Duplex (TDD) system, a Universal Mobile Telecommunication System (UMTS), a Worldwide Interoperability for Microwave Access (WiMAX) communication system, a New Radio (NR) System or a future 5G system, etc.

In particular, the technical solutions of the implementations of the present application can be applied to various communication systems based on non-orthogonal multiple access technologies, such as a Sparse Code Multiple Access (SCMA) system, and a Low Density Signature (LDS) system, etc. Of course, the SCMA system and the LDS system may also be referred to as other names in the communication field. Further, the technical solutions of the implementations of the present application can be applied to a multicarrier transmission system employing non-orthogonal multiple access technology, such as an Orthogonal Frequency Division Multiplexing (OFDM) system based on the non-orthogonal multiple access technology, a Filter Bank Multi-Carrier (FBMC) system, a Generalized Frequency Division Multiplexing (GFDM) system, and a Filtered OFDM (F-OFDM) system, etc.

Figure 1:
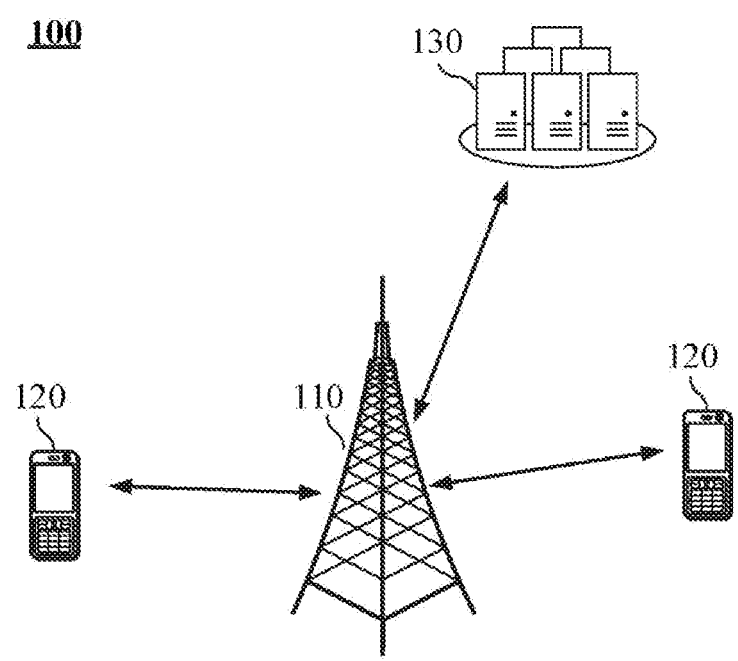
FIG. 1 is an example of an application scenario of the present disclosure.

FIG. 1 shows a wireless communication system 100 to which an implementation of the present application is applied. The wireless communication system 100 may include an access network device 110. The access network device 110 may be a device that communicates with a terminal device. The access network device 110 may provide communication coverage for a specific geographic area and may communicate with a terminal device (e.g., UE) located within the coverage area. Optionally, the access network device 110 may be a base station (gNB) in a Next Generation Radio Access Network (NG RAN) or an NR system, or a radio controller in a Cloud Radio Access Network (CRAN), or the access network device may be a relay station, an access point, an on-board device, a wearable device, or a network device in a future evolved Public Land Mobile Network (PLMN), etc. Optionally, the access network device 110 may further be a base station in an LTE system, for example, an evolved Universal Terrestrial Radio Access Network (E-UTRAN) device.

The wireless communication system 100 also includes at least one terminal device 120 located within the coverage area of the access network device 110. The terminal device 120 may be mobile or fixed. Optionally, the terminal device 120 may be referred to as an access terminal, a User Equipment (UE), a subscriber unit, a subscriber station, a mobile station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolved Public Land Mobile Network (PLMN), or the like.

In an implementation of the present disclosure, the wireless communication system 100 further includes a core network device 130 that communicates with the access network device. Optionally, the core network device 130 may be a 5G core network device, for example, an Access and Mobility Management Function (AMF), for another example, a Session Management Function (SMF). Optionally, the core network device 130 may also be an Evolved Packet Core (EPC) device of the LTE network, for example, a Session Management Function+Core Packet Gateway (SMF+PGW-C) device.

It should be understood that SMF+PGW-C may realize the functions which can be realized by the SMF and the PGW-C at the same time.

Optionally, in an implementation of the present application, the AMF may perform information interaction with the SMF, for example, the SMF acquires information of the radio access network side from the AMF.

Alternatively, in an implementation of the present application, the AMF may acquire a fallback identification from the radio access network, or acquire a message indicating that the bearer/flow is not successfully established for the terminal device.

FIG. 1 illustrates one access network device, one core network device and two terminal devices. Optionally, the wireless communication system 100 may include multiple access network devices, and another quantity of terminal devices may be included within the coverage area of each access network device, which is not restricted in implementations of the present application. Optionally, the wireless communication system 100 may further include a Mobile Management Entity (MME), a Unified Data Management (UDM), an Authentication Server Function (AUSF), a User Plane Function (UPF), a Signaling Gateway (SGW) or other network entities, which is not restricted in implementations of the present application. It should be understood that the terms "system" and "network" are often used interchangeably in this document. The term "and/or" in this document is merely an association relationship describing associated objects, indicating that there may be three relationships, for example, A and/or B may indicate three cases: A alone, A and B, and B alone. In addition, the symbol "/" in this document generally indicates that objects before and after the symbol "/" have an "or" relationship.

In addition, the terminal device shown in FIG. 1 may establish and/or bind a Protocol Data Unit (PDU) session according to a route selection descriptor table corresponding to a first rule in a UE Route Selection Policy (URSP). The route selection descriptor table includes at least one group of index combinations. Each group of index combinations in the at least one group of index combinations includes at least one index. Each group of index combinations is used for indicating a group of parameter combinations. The parameter combination includes a value of each of at least one parameter for establishing and/or binding a PDU session. The at least one index corresponds to the at least one parameter in a one-to-one way, and the each parameter includes at least one value.

Therefore, URSP is introduced in an implementation of the present disclosure, and the URSP policy is a policy for selecting different Protocol Data Unit (PDU) Sessions. The URSP policy specifies a routing policy of UE for different data flow filters. For UE, there is only one URSP, and there may be multiple rules in the URSP, and the rules in the URSP may include, but not limited to, Traffic descriptors, Application identifiers, Internet Protocol (IP) descriptors, non-IP descriptors and Route Selection descriptor (RSD). Each rule may further have a different priority value. The RSD table includes, but not limited to, a value of at least one parameter for establishing and/or binding Protocol Data Unit (PDU) sessions, such as, a session and service continuity mode, Network Slice Selection Assistance Information (NSSAI), a Data Network Name (DNN), a non-seamless traffic offloading indicator, a radio access type. Each parameter may include at least one value. The parameter combination in an implementation of the present application may refer to a combination of values of various parameters, for example, a parameter combination of a session and service continuity mode 1, NSSAI_1, a DNN_1, a non-seamless traffic offloading indicator as allowance, and a radio access type of the 3rd Generation Partnership Project (3GPP), and another parameter combination of a Session and service Continuity Mode 1, NSSAI_2, a DNN_3, a Non-Seamless traffic offloading indicator of Allowance, and a radio access type of the 3rd Generation Partnership Project (3GPP). In an implementation of the present application, all values of each parameter may be represented by indexes firstly. For example, the session and service continuity mode has three values, the session and service continuity mode 1 is represented by index 1, the session and service continuity mode 2 is represented by index 2, and the session and service continuity mode 3 is represented by index 3. Then an index combination may be used for indicating a parameter combination. For example, the index combination is [2; 1; 2; 1; 1], assuming that the parameters represented by indexes in the index combination from left to right are a session and service continuity mode, NSSAI, a DNN, a non-seamless traffic offloading indicator and a radio access type, respectively. Then the index combination [2; 1; 2; 1; 1] represents a parameter combination of a Session and service Continuity Mode 2, NSSAI_1, a DNN_2, a non-seamless traffic offloading indicator of allowance, and a radio access type of 3GPP. In an implementation of the present application, at least one index combination may be added to the RSD table, and the terminal device may establish and/or bind a PDU session according to parameter values in a parameter combination indicated by the at least one index combination.

Figure 2:
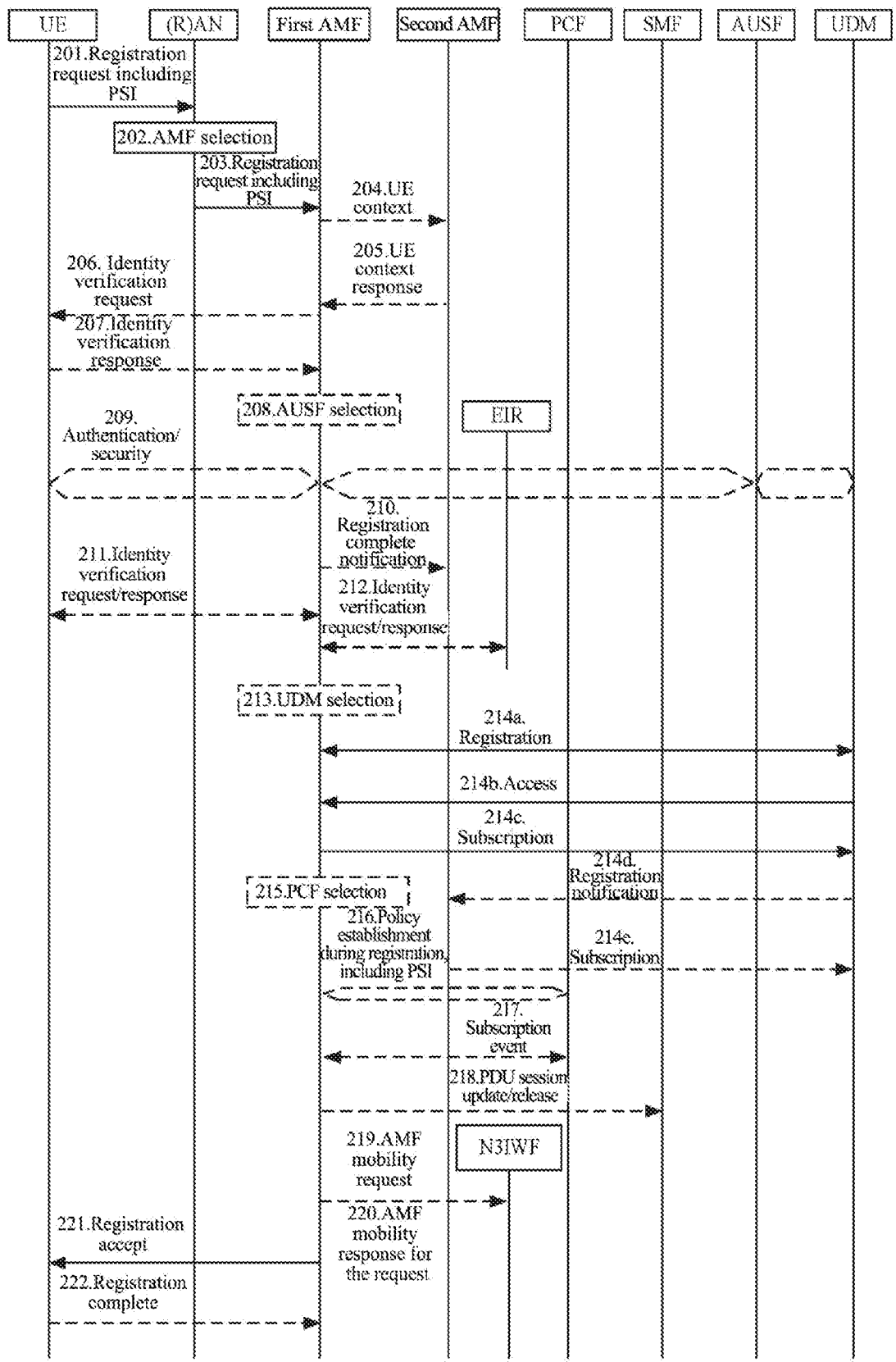
FIG. 2 is a schematic block diagram of a wireless communication method according to an implementation of the present disclosure.
Figure 3:
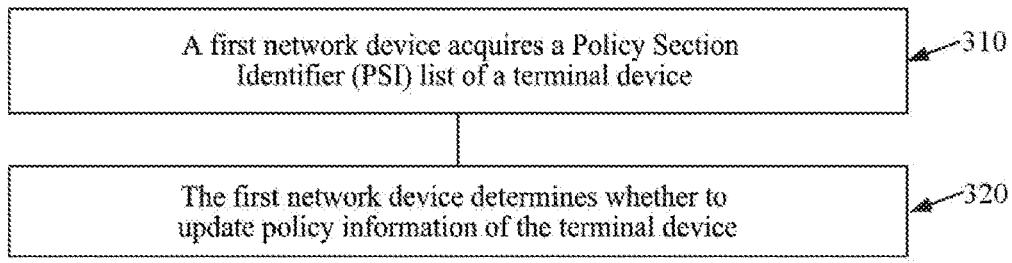
FIG. 3 is another schematic block diagram of a wireless communication method according to an implementation of the present disclosure.

FIGS. 2 and 3 show schematic block diagrams of wireless communication methods according to implementations of the present application. The terminal devices shown in FIGS. 2 and 3 may be the terminal device shown in FIG. 1. The method shown in FIG. 2 includes some or all of the following.

In 201, a terminal device sends a registration request to a (Radio) Access Network ((R)AN), including a PSI parameter.

In 202, the (Radio) Access Network ((R)AN) performs Access and Mobility Management Function (AMF) selection.

In 203, the (R)AN sends a registration request to a second AMF, including a PSI parameter.

In 204, a first AMF sends a UE context to the second AMF.

In 205, the second AMF sends a UE context response to the first AMF.

In 206, the first AMF sends an identity verification request to the terminal device.

In 207, the terminal device sends an identity verification response to the first AMF.

In 208, the first AMF performs Authentication Server Function (AUSF) selection.

In 209, an authentication/security operation is performed between the terminal device and the first AMF.

In 210, the first AMF sends a registration complete notification to the second AMF.

In 211, the first AMF performs an identity verification request/response operation with the terminal device and the AUSF respectively, and the AUSF performs an identity verification request/response operation with the Unified Data Management (UDM).

In 212, an identity verification request/response operation is performed between the Equipment Identity Register (EIR) and the first AMF.

In 213, the first AMF performs UDM selection.

In 214a, the first AMF sends a registration message to the UDM.

In 214b, the UDM sends an access message to the first AMF.

In 214c, the first AMF sends a subscription message to the UDM.

In 214d, the UDM sends a registration notification message to the second AMF.

In 214e, the second AMF sends a subscription to the UDM.

In 215, the first AMF performs a Policy Control Function (PCF) selection.

In 216, the first AMF and the PCF establish a policy during the registration process, including a PSI parameter.

In 217, the first AMF and the PCF perform a subscription event operation.

In 218, the first AMF sends an update/release PDU session to a Session Management Function (SMF).

In 219, the first AMF sends an AMF mobility request to a non-3GPP interworking function N3 (N3IWF).

In 220, the N3IWF sends an AMF mobility response for the request to the first AMF.

In 221, the first AMF sends a Registration Accept to the terminal device.

In 222, the terminal device sends a first Registration Complete to the first AMF.

As shown in FIG. 2, since the Policy Section Identifier (PSI) list of the User Equipment (UE) in a plaintext is added into an initial registration message to be sent to the Policy Control Function (PCF), i.e., acts 201, 203 and 216, it is easy to be intercepted by other users, causing potential safety hazards.

For example, UE-2 acquires the PSI parameter of UE-1 through the Registration Request of UE-1 (because the Registration Request is sent in a plaintext), then UE-2 may initiate a registration request carrying the PSI parameter of UE-1, and the network device will send the UE Policy of UE-1 to UE-2, causing potential security risk and privacy leak. For another example, assuming that the content of the UE Policy is falsified or partially lost, but the UE always reports the same PSI parameter to the network side, then the network side does not send a new UE Policy, thus the content of the UE Policy is falsified or partially lost.

To solve the above technical problems, a wireless communication method is provided in an implementation of the present disclosure.

FIG. 3 is a schematic block diagram of another wireless communication method according to an implementation of the present disclosure.

Specifically, as shown in FIG. 3, the method 300 includes the following acts 310-320.

In 310, a first network device acquires a Policy Section Identifier (PSI) parameter of a terminal device.

In 320, the first network device determines whether to update policy information of the terminal device.

Specifically, the first network device determines whether to update policy information of a terminal device after acquiring the Policy Section Identifier (PSI) parameter of the terminal device. If determining to update the policy information of the terminal device, the first network device updates the policy information of the terminal device. It should be understood that measurement information in an implementation of the present disclosure may include, but not limited to, a first policy, a UE Route Selection Policy (URSP) policy, and a Wireless Local Area Network Selection Policy (WLANSP). Herein, the first policy may be a policy for selecting a Service Set Identifier (SSID) for wireless local area network (WLAN) access, and the URSP policy is a policy for selecting different Protocol Data Unit (PDU) Sessions. In an implementation of the present disclosure, a Policy Section Identifier (PSI) list is introduced to flexibly divide the UE policy. For the use of PSI parameter, it may be understood that the terminal device adds the PSI parameter saved by the terminal device into a request message for Initial registration to send to the PCF, so that the PCF can acquire what the PSI parameter currently stored by the terminal device is like, for the PCF to adjust the UE Policy as needed.

Below an implementation mode in which the first network device determines whether to update the policy information of the terminal device in an implementation of the present disclosure will be described.

In an implementation, the PSI parameter includes a subscriber identifier. In this case, the first network device receives a subscriber identifier sent by a second network device; and the first network device determines whether to update a policy of the terminal device according to the subscriber identifier corresponding to the PSI parameter and the subscriber identifier sent by the second network device. In a specific implementation, the first network device determines to update the policy information of the terminal device when determining that the subscriber identifier corresponding to the PSI parameter is different from the subscriber identifier sent by the second network device. Specifically, when the first network device determines that the subscriber identifier corresponding to the PSI parameter is different from the subscriber identifier sent by the second network device, the first network device sends policy information corresponding to the subscriber identifier of the terminal device currently used to the terminal device. More specifically, when the first network device determines that the subscriber identifier corresponding to the PSI parameter is different from the subscriber identifier sent by the second network device, the first network device sends policy information corresponding to the subscriber identifier sent by the second network device to the terminal device.

Herein, the subscriber identifier includes a Subscriber Private Identifier (SUPI) and/or a Subscriber Concealed Identifier (SUCI). In other alternative implementations, the subscriber identifier may be an International Mobile Subscriber Identification Number (IMSI) assigned to the UE by a service provider (SP). The IMSI is a sign for distinguishing mobile subscribers, is stored in a Subscriber Identification Module (SIM) card, and may be used for distinguishing valid information of mobile subscribers. The subscriber identifier may be a Temporary Mobile Subscriber Identity (S-TMSI) or an International Mobile Equipment Identity (IMEI) or the like.

In an implementation of the present disclosure, global uniqueness of the PSI parameter is uniquely identified by the subscriber identifier (e.g., SUPI and/or SUCI) in the PSI parameter, so that the network device can timely/correctly update the policy information of the terminal device. In addition, with this solution, the PSI parameter is used for identifying a part of policy information for the terminal device under a subscribed user, and a quantity of its Bits is relatively small, therefore there only needs to distinguish (dozens of) different PSI parameters under one subscribed user. Finally, with this solution, the first network device can timely/correctly determine whether the terminal device needs to update the policy information by comparing the subscriber identifier carried in the PSI parameter of the terminal device with the subscriber identifier acquired from the second network device.

It should be understood that the first network device involved in an implementation of the present disclosure may be PCF or a core network device, and the second network device may be AMF or a core network device, which is not specifically restricted in implementations of the present disclosure.

In an implementation of the present disclosure, the PSI parameter including a subscriber identifier is taken as an example, and implementations of the present disclosure are not limited thereto. For example, in other implementations, the PSI parameter includes a Public Land Mobile Network (PLMN) identifier and a first identifier, the first identifier is used for uniquely identifying a PSI parameter under a PLMN. In this case, in a realizable implementation, the PSI parameter may further include a timestamp and/or a version identifier. Therefore, the first network device may acquire a last update time of the policy information of the terminal device according to the timestamp and/or the version identifier in the PSI parameter, and determine whether to update the policy information of the terminal device according to an update time threshold and/or a latest version. For example, China Mobile's PLMN is 46000, and China Unicorn's PLMN is 46001.

In an implementation of the present disclosure, the PSI parameter is uniquely identified by the PLMN identifier and first identifier. In this case, a quantity of bits of the first identifier will be very large (hundreds of millions), and multiple PSI parameters may be carried under one SUPI, which has a great influence on the network side. However, for users, the security is higher. In addition, in an implementation of the present disclosure, a last update time of the policy information of the terminal device is acquired through the timestamp and/or version identifier in the PSI parameter, and then whether to update the policy information of the terminal device is determined according to a update time threshold and/or a latest version, so that whether the terminal device needs to update the policy information can be timely/correctly determined.

Furthermore, an implementation of the present disclosure further provides a way to update the policy information of the terminal device. Specifically, the first network device updates the policy information of the terminal device when determining to update a policy of the terminal device. In an implementation, the first network device may periodically update the policy information of the terminal device. In another implementation, the first network device may periodically update the policy information of the terminal device. Further, when the first network device determines to update a policy of the terminal device, an implementation of the present disclosure further provides an implementation mode for updating the policy information. For example, when the first network device determines to update the policy information of the terminal device, the first network device may send all policy information to the terminal device, so that the terminal device selects part of the policy information to use from the all policy information according to a capability of the terminal device. However, due to different capabilities of the terminal device, the capabilities supported by different terminals are different, and policy information needed will be different. At present, all rules subscribed by the users are sent to the terminal device without distinguishing the capabilities of the terminal device, which will cause excessive signaling load and additional terminal burden. In an implementation of the present disclosure, the first network device may send/update part of policy information to the terminal device according to the capability information of the terminal device. Herein, the capability information includes at least one of the following information: a Permanent Equipment Identifier (PEI), a voice support capability of the terminal device, a Radio Frequency Selection Priority (RFSP) parameter of the terminal device, Single-Network Slice Selection Assistance Information (S-NSSAI) reported by the terminal device, whether an operating system supports receiving and/or identifying a Data Network Name (DNN) parameter sent by an application layer, and whether mapping an upper layer request message of 3GPP into a parameter indicating a PDU session characteristic is supported. For example, a parameter for mapping an upper layer request message of 3GPP for session establishment/modification may be a DNN parameter. Further, before the first network device updates the policy information of the terminal device according to the capability information of the terminal device, the first network device acquires the capability information of the terminal device.

It should be understood that the policy information (UE Policy) in an implementation of the present application may include multiple parameters.

The policy information of an implementation of the present application will be explained as an example below with reference to Table 1.

TABLE 1

| | UE route selection policy rule | |
|---|---|---|
| Parameter name | Description | Level |
| Rule priority | Determine an order by which URSP rules are executed | Required |
| Traffic descriptor | Describe characteristics of the traffic | |
| Application descriptor | Include an application identifier recognizable by a terminal operating system, the application identifier uniquely refers to a certain application | Optional |
| IP descriptor | IP triple or IPv6 prefix, port number, protocol identifier, etc. | Optional |
| Non-IP descriptor | Describe characteristics of non-IP packets | Optional |
| DNN | DNN is provided by an application layer | Optional |
| Connectivity capability | The capability parameter is provided by an application layer and used for requesting to run data on a connection supporting the capability | Optional |
| Route selection descriptor | Route selection descriptor list, see table 2 for its specific content | Required |

TABLE 2

| | Route selection descriptor | |
|---|---|---|
| Parameter name | Description | Level |
| Route selection descriptor priority | Determine an order by which route selection descriptors are used | Required |
| Route selection parameter | Define a sum of route selection parameters | Optional |
| Service and continuity mode selection | Contain one value | Optional |
| Network slice selection | Contain one or more values | Optional |
| DNN selection | Contain one or more DNNs | Optional |
| PDU session type selection | Contain one type value | Optional |
| Non-seamless traffic offloading indicator | Indicate whether specific traffic needs to be offloaded to non-3GPP access | Optional |
| Access type selection | Indicate data traffic running on PDU sessions corresponding to 3GPP or non-3GPP access | Optional |

As shown in table 1, UE Policy may include a UE route selection policy rule which may include a route selection descriptor. Further, as shown in FIG. 2, the route selection descriptor may include multiple parameters, for example, a route selection descriptor priority, a route selection parameter service and a continuity mode selection, etc.

In an implementation of the present application, when the terminal device receives all policy information sent by the first network device, the terminal device may select part of the policy information to use from the all policy information according to a capability of the terminal device. Further, the terminal device may perform a first behavior or a second behavior on the policy information according to the capability of the terminal device.

The first behavior refers to that after the terminal device selects a first rule of a first priority, if the terminal device does not support a first parameter in the first rule, the terminal device does not select the first rule but selects a second rule of a second priority.

For example, if the terminal device does not support a connection capability parameter in the first rule, the first rule of the first priority is abandoned and the second rule of the second priority is selected.

For another example, if the terminal device does not support the access type selection parameter in the route selection descriptor of the first priority, the route selection descriptor of the first priority is not selected, and the route selection descriptor of the second priority is selected. Optionally, the route restriction descriptor of the first priority and the route restriction descriptor of the second priority belong to the same UE route selection policy rule.

The second behavior refers to that after the terminal device selects the first rule of the first priority, if the terminal device does not support the first parameter in the first rule, the terminal device does not select the first parameter, and parameters other than the first parameter in the first rule remain valid.

For example, if the terminal device does not support the connection capability parameter in the first rule, the connection capability parameter in the first rule is abandoned and other parameters in the first rule remain valid.

For another example, if the terminal device does not support the access type selection parameter in the route selection descriptor of the first priority, the access type selection parameter in the route selection descriptor of the first priority is not selected, and other parameters in the route selection descriptor of the first priority remain valid.

It should be noted that since UE capability may not support all parameters, negotiation for UE capability and network behavior is needed to ensure that policy information is parameters that UE capability can support. The connection capability is taken as an example below to explain that negotiation for UE capability and network behavior is needed in combination with Table 3.

TABLE 3

| | Connectivity capability | |
|---|---|---|
| Parameter name | Description | Level |
| Connectivity capability | The parameter is provided by a UE application layer and is used for requesting a connection with a specific capability, such as supporting a specific DNN of a PDU session. | Optional |

As shown in Table 3, the connection capability may refer to that a communication capability (e.g., an IMS service, a voice service, etc.) requested by an application layer is mapped, through an OS layer, to DNN parameters that may be recognized and supported by a 3GPP layer (a communication layer), and UE uses the mapped DNN to establish/modify a PDU session. Therefore, negotiation of UE capability and network behavior is needed. For another example, whether the OS of the UE can directly identify a DNN provided by the application layer or allow the application layer to provide DNN information (such as opening a specific API interface), thereby binding the traffic corresponding to the belonged DNN to the PDU session corresponding to the route selection descriptor, is an optional item, therefore negotiation of UE capability and network behavior is also needed.

In an implementation of the present application, the negotiation of UE capability and network behavior may include the following two approaches.

1) The UE reports supported capabilities to a network element at the network side. If the UE does not support a specific capability, such as a connection capability, the network side sends a UE policy that does not contain this parameter.

(2) After receiving the UE policies sent by the network side, the UE performs selection according to its own capabilities, ignores or deactivates those UE policies that contain parameters which the UE does not support. Additionally and optionally, unsupported parameters and/or unsupported policies are reported to the network side. Optionally, then the network side may perform updating accordingly.

In addition, an implementation of the present disclosure further provides a wireless communication method, which includes: a first network device determines that a registration request message does not carry a Policy Section Identifier (PSI) parameter. Herein, the PSI parameter is used for identifying a part of policy information for a terminal device under a subscribed user; and a first network device sends policy information to the terminal device. For the terminal device, the terminal device sends a registration request message to the network device, wherein the registration request message does not carry a PSI parameter or the PSI parameter is null. The terminal device receives policy information sent by the first network device. For example, when a Subscriber Identification Module (SIM) card is changed, the terminal device initiates an initial registration request message in which a PSI parameter is not carried or the PSI parameter is set to be null, and clears the PSI parameters stored locally. For another example, the terminal device does not carry a PSI parameter or sets the PSI parameter to be null in an initial registration request message when a non-SIM card is unchanged. In this case, the terminal device receives policy information corresponding to a subscriber identifier of the terminal device currently used, which is sent by the first network device. Further, the terminal device may further clear PSI parameters stored locally.

Further, the first network device determines that the registration request message may further carry first indication information for indicating that a Subscriber Identification Module (SIM) card of the terminal device has been changed.

Therefore, the first network device may directly update the policy information of the terminal device according to the first indication information. In an implementable mode, the first network device may generate second indication information after receiving the first indication information, wherein the second indication information is used for instructing the terminal device to delete and/or add policy information corresponding to each PSI parameter in at least one PSI parameter; and then, the first network device sends the second indication information to the terminal device. In such way, the terminal device may delete and/or add policy information according to the second indication information after receiving the second indication information sent by the first network device.

Further, the first network device sends policy information to the terminal device according to mapping relationship information which includes a corresponding relationship between subscriber identifiers and PSI parameters. For example, the first network device may generate the second indication information according to the mapping relationship information of the terminal device. In an implementation of the present disclosure, before the first network device generates the second indication information according to the mapping relationship information of the terminal device, the first network device may further store the mapping relationship information of the terminal device.

In addition, an implementation of the present disclosure further provides a wireless communication method, which includes: a first network device sends/updates part of policy information to a terminal device according to capability information of the terminal device. The capability information includes at least one of the following information: a Permanent Equipment Identifier (PEI), a voice support capability of the terminal device, a Radio Frequency Selection Priority (RFSP) parameter of the terminal device, Single-Network Slice Selection Assistance Information (S-NSSAI) reported by the terminal device, whether an operating system supports receiving and/or identifying a Data Network Name (DNN) parameter sent by an application layer, and whether mapping an upper layer request message of 3GPP into a parameter indicating a PDU session characteristic is supported.

Optionally, the first network device acquires capability information of the terminal device.

In other words, the terminal device sends the capability information of the terminal device to the first network device; and the terminal device receives the policy information of the terminal device sent by the first network device.

The mapping relationship in an implementation of the present disclosure will be described below with reference to FIGS. 4 and 5.

In an implementation, multiple subscriber identifiers in the mapping relationship information correspond to multiple PSI parameters, i.e., one PSI parameter in the mapping relationship information corresponds to multiple subscriber identifiers. The technical solution can effectively reduce data storage amount of the first network device. For example, as shown in FIG. 4, the first network device may establish a mapping relationship between subscriber 1, subscriber 2, and subscriber 3 and all policy information. For example, subscriber 1 corresponds to PSI 1, PSI 3, and PSI 5, subscriber 2 corresponds to PSI 2 and PSI 3, and subscriber 3 corresponds to PSI 4, PSI 5, and PSI n. Herein, each PSI indicates one piece of policy information. In other alternative implementations, each subscriber identifier in the mapping relationship information corresponds to at least one PSI parameter separately, and further, one PSI parameter in the mapping relationship information corresponds to one subscriber identifier only. For example, as shown in FIG. 5, subscriber 1, subscriber 2, and subscriber 3 respectively establish corresponding relationships between PSI parameters corresponding to policy information and subscriber identifiers. For example, subscriber 1 corresponds to PSI 1, PSI 2, and PSI 3, PSI 1 is used for indicating policy information 1, PSI 2 is used for indicating policy information 2, and PSI 3 is used for indicating policy information 3. It should be noted that since each subscriber identifier in the mapping relationship information corresponds to at least one PSI parameter separately, PSI and policy information between subscribers will not affect each other, and therefore, the same PSI or policy information may be used repeatedly. For example, as shown in FIG. 5, PSI 4 corresponding to subscriber 2 may also be used for indicating policy information 3. In other words, the first network device may only send policy information according to the subscriber identifier.

Figure 4:
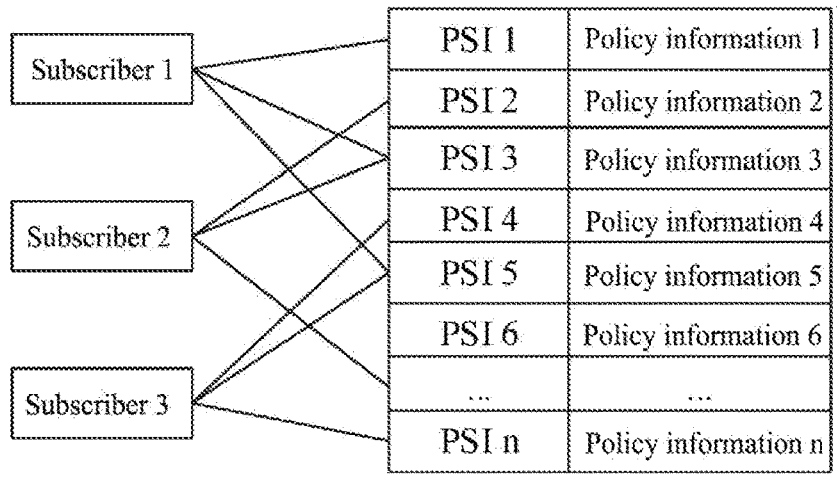
FIG. 4 is a schematic diagram of a mapping relationship between policy information and subscribers stored in a terminal device at a network side according to an implementation of the present disclosure.
Figure 5:
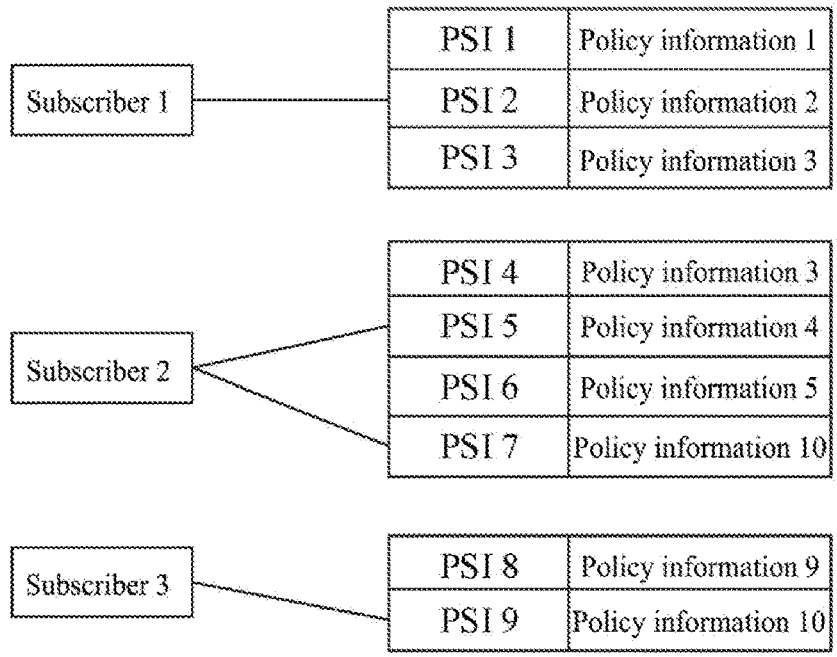
FIG. 5 is a schematic diagram of another mapping relationship between policy information and subscribers stored in a terminal device at a network side according to an implementation of the present disclosure.

It should be understood that the mapping relationship information shown in FIGS. 4 and 5 is only illustrative, and an implementation of the present disclosure does not specifically limit a form and quantity of the mapping relationship information. For example, subscriber 2 shown in FIG. 4 may further correspond to other multiple PSIs. For another example, the mapping relationship information may be in a form of a table or a form of a graph.

Figure 6:
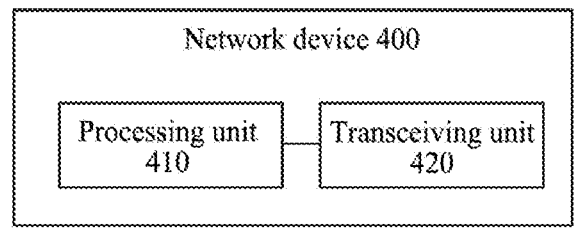
FIG. 6 is a schematic block diagram of a network device according to an implementation of the present disclosure.

FIG. 6 is a schematic block diagram of a network device according to an implementation of the present disclosure.

Specifically, as shown in FIG. 6, the network device 400 includes a processing unit 410.

The processing unit 410 is used for determining whether to update policy information of a terminal device after acquiring a Policy Section Identifier (PSI) parameter of the terminal device.

Optionally, the PSI parameter includes a subscriber identifier.

Herein, the network device further includes a transceiving unit 420.

The transceiving unit 420 is used for receiving a subscriber identifier sent by a second network device.

The processing unit 410 is specifically used for determining whether to update the policy information of the terminal device according to the subscriber identifier corresponding to the PSI parameter and the subscriber identifier sent by the second network device.

Optionally, the processing unit 410 is further specifically used for: determining to update the policy information of the terminal device when determining that the subscriber identifier corresponding to the PSI parameter is different from the subscriber identifier sent by the second network device.

Optionally, the processing unit 410 is further specifically used for sending policy information corresponding to a subscriber identifier of the terminal device currently used to the terminal device.

Optionally, the processing unit 410 is further specifically used for sending policy information corresponding to the subscriber identifier sent by the second network device to the terminal device.

Optionally, the subscriber identifier includes a Subscriber Private Identifier (SUPI) and/or a Subscriber Concealed Identifier (SUCI).

Optionally, the PSI parameter includes a Public Land Mobile Network (PLMN) identifier and a first identifier, and the first identifier is used for uniquely identifying a PSI parameter under the PLMN.

Optionally, the PSI parameter includes a timestamp and/or a version identifier.

Herein, the processing unit 410 is specifically used for: acquiring a last update time of the policy information of the terminal device according to the timestamp and/or the version identifier in the PSI parameter, and determining whether to update the policy information of the terminal device according to an update time threshold and/or a latest version.

Optionally, the processing unit 410 is further used for: updating the policy information of the terminal device when determining to update a policy of the terminal device.

Optionally, the processing unit 410 is specifically used for: updating periodically the policy information of the terminal device.

Optionally, the processing unit 410 is specifically used for: sending/updating part of the policy information to the terminal device according to capability information of the terminal device.

Optionally, the capability information of the terminal device includes at least one of the following:

a Permanent Equipment Identifier (PEI), a voice support capability of the terminal device, a Radio Frequency Selection Priority (RFSP) parameter of the terminal device, Single-Network Slice Selection Assistance Information (S-NSSAI) reported by the terminal device, whether an operating system supports receiving and/or identifying a Data Network Name (DNN) parameter sent by an application layer, and whether mapping an upper layer request message of 3GPP into a parameter indicating a PDU session characteristic is supported.

Optionally, the processing unit 410 is further used for: acquiring the capability information of the terminal device before updating the policy information of the terminal device according to the capability information of the terminal device.

Optionally, the processing unit 410 is specifically used for: sending all policy information to the terminal device so that the terminal device selects part of the policy information to use from the all policy information according to a capability of the terminal device.

Optionally, the network device is a Policy Control Function (PCF).

Optionally, the second network device is an Access and Mobility Management Function (AMF).

Figure 7:
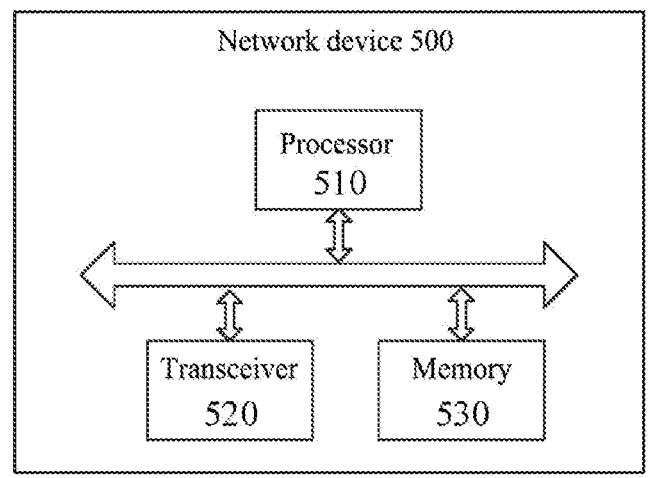
FIG. 7 is a schematic diagram of another network device according to an implementation of the present disclosure.

In an implementation of the present disclosure, the processing unit 410 may be implemented by a processor, and the transceiving unit 420 may be implemented by a transceiver. As shown in FIG. 7, a network device 500 may include a processor 510, a transceiver 520, and a memory 530. The memory 530 may be used for storing indication information, or may be used for storing codes, instructions, etc., executed by the processor 510. The various components in the network device 500 are connected by a bus system. The bus system includes a power bus, a control bus and a status signal bus in addition to a data bus.

The network device 500 shown in FIG. 7 can implement the various processes implemented by the first network device in the method implementation shown in FIG. 3. To avoid duplication, the details will not be repeated here.

Figure 8:
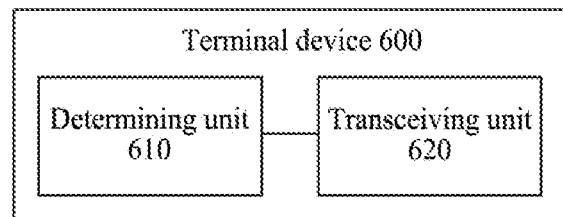
FIG. 8 is a schematic block diagram of a terminal device according to an implementation of the present disclosure.

FIG. 8 is a schematic block diagram of a terminal device 600 according to an implementation of the present disclosure.

Specifically, as shown in FIG. 8, the terminal device 600 includes a determining unit 610 and a transceiving unit 620.

The determining unit 610 is used for determining a Policy Section Identifier (PSI) parameter which is used for identifying a part of policy information for the terminal device under a subscribed user.

The transceiving unit 620 is used for sending the PSI parameter to a first network device.

Optionally, the PSI parameter includes a subscriber identifier.

Optionally, the transceiving unit 620 is further used for: receiving policy information corresponding to a subscriber identifier of the terminal device currently used, which is sent by the first network device.

Optionally, the transceiving unit 620 is specifically used for: receiving policy information corresponding to a subscriber identifier sent by a second network device.

Optionally, the subscriber identifier includes a Subscriber Private Identifier (SUPI) and/or a Subscriber Concealed Identifier (SUCI).

Optionally, the PSI parameter includes a Public Land Mobile Network (PLMN) identifier and a first identifier, and the first identifier is used for uniquely identifying a PSI parameter under the PLMN.

Optionally, the transceiving unit 620 is further used for: receiving the policy information of the terminal device sent by the first network device.

Optionally, the transceiving unit 620 is further specifically used for: receiving periodically policy information of the terminal device sent by the first network device.

Optionally, the policy information of the terminal device is the policy information of the terminal device determined by the first network device according to capability information of the terminal device.

Optionally, the capability information of the terminal device includes at least one of the following: Permanent Equipment Identifier (PEI), a voice support capability of the terminal device, a Radio Frequency Selection Priority (RFSP) parameter of the terminal device, Single-Network Slice Selection Assistance Information (S-NSSAI) reported by the terminal device, whether an operating system supports receiving and/or identifying a Data Network Name (DNN) parameter sent by an application layer, and whether mapping an upper layer request message of 3GPP into a parameter indicating a PDU session characteristic is supported.

Optionally, the transceiving unit 620 is further used for: before receiving the policy information of the terminal device sent by the first network device, sending the capability information of the terminal device to the first network device.

Optionally, the transceiving unit 620 is specifically used for: receiving all of the policy information of the terminal device sent by the first network device; and wherein the determining unit is further used for selecting part of the policy information to use from the all policy information according to a capability of the terminal device.

Optionally, the first network device is a Policy Control Function (PCF).

Optionally, the second network device is an Access and Mobility Management Function (AMF).

Figure 9:
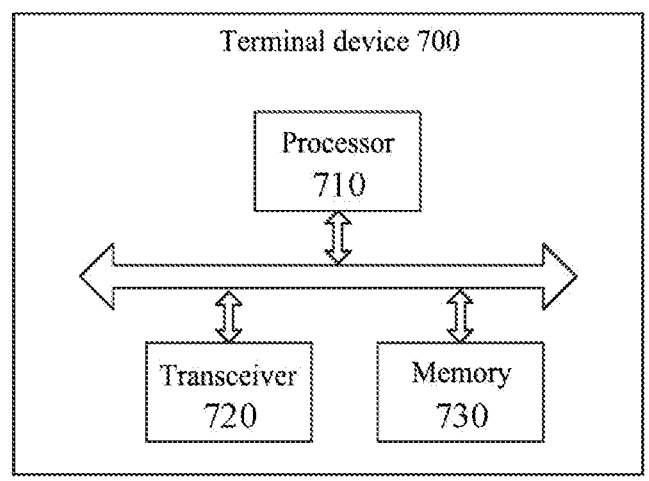
FIG. 9 is a schematic block diagram of another terminal device according to an implementation of the present disclosure.

In an implementation of the present disclosure, the determining unit 610 may be implemented by a processor, and the transceiving unit 620 may be implemented by a transceiver. As shown in FIG. 9, a terminal device 700 may include a processor 710, a transceiver 720, and a memory 730. The memory 730 may be used for storing indication information, or may be used for storing codes, instructions, etc., executed by the processor 710. The various components in the terminal device 700 are connected by a bus system. The bus system includes a power bus, a control bus and a status signal bus in addition to a data bus.

The terminal device 700 shown in FIG. 9 can implement the various processes implemented by the terminal device in the method implementation shown in FIG. 3. To avoid duplication, the details will not be repeated here. That is, a method implementation in implementations of the present disclosure may be applied to or implemented by a processor.

In addition, an implementation of the present disclosure further provides a network device, which includes a processing unit and a transceiving unit. The processing unit is used for determining that the registration request message does not carry a Policy Section Identifier (PSI) parameter, wherein the PSI parameter is used for identifying a part of policy information for the terminal device under a subscribed user. The transceiving unit is used for sending policy information to the terminal device.

Optionally, the processing unit is further used for determining that the registration request message carries first indication information, wherein the first indication information is used for indicating that a Subscriber Identification Module (SIM) card of the terminal device has been changed.

Optionally, the processing unit is further used for generating second indication information, wherein the second indication information is used for instructing the terminal device to delete and/or add policy information corresponding to each PSI parameter in at least one PSI parameter; wherein the transceiving unit is further used for sending second indication information to the terminal device.

Optionally, the transceiving unit is specifically used for sending the policy information to the terminal device according to mapping relationship information, wherein the mapping relationship information includes a corresponding relationship between subscriber identifiers and PSI parameters.

Optionally, each subscriber identifier in the mapping relationship information corresponds to at least one PSI parameter separately.

Optionally, one PSI parameter in the mapping relationship information corresponds to one subscriber identifier only.

Optionally, multiple subscriber identifiers in the mapping relationship information correspond to multiple PSI parameters.

Optionally, one PSI parameter in the mapping relationship information corresponds to multiple subscriber identifiers.

Optionally, the transceiving unit is specifically used for sending policy information corresponding to a subscriber identifier sent by a second network device to the terminal device.

An implementation of the disclosure further provides a terminal device, which includes a transceiving unit, used for sending a registration request message to the network device. Herein, the registration request message does not carry a Policy Section Identifier (PSI) parameter, and the PSI parameter is used for identifying a part of policy information for the terminal device under a subscribed user. The transceiving unit is further used for receiving policy information sent by a first network device. For example, when a Subscriber Identification Module (SIM) card is changed, the terminal device initiates an initial registration request message in which a PSI parameter is not carried or the PSI parameter is set to be null, and clears the PSI parameters stored locally. For another example, the terminal device does not carry a PSI parameter or sets the PSI parameter to be null in an initial registration request message when a non-SIM card is unchanged.

Optionally, the registration request message carries first indication information, wherein the first indication information is used for indicating that a Subscriber Identification Module (SIM) card of the terminal device has been changed.

Optionally, the transceiving unit is specifically used for: receiving second indication information sent by the first network device, wherein the second indication information is used for instructing the terminal device to delete and/or add policy information corresponding to each PSI parameter in at least one PSI parameter; and deleting and/or adding policy information according to the second indication information.

Optionally, the transceiving unit is specifically used for receiving policy information corresponding to a subscriber identifier of the terminal device currently used, which is sent by the first network device.

Optionally, the terminal device further includes a processing unit for clearing PSI parameters stored locally.

An implementation of the present application further provides a network device, which includes: a transceiving unit, used for sending/updating part of policy information to the terminal device according to capability information of the terminal device.

Optionally, the capability information includes at least one of the following: a Permanent Equipment Identifier (PEI), a voice support capability of the terminal device, a Radio Frequency Selection Priority (RFSP) parameter of the terminal device, Single-Network Slice Selection Assistance Information (S-NSSAI) reported by the terminal device, whether an operating system supports receiving and/or identifying a Data Network Name (DNN) parameter sent by an application layer, and whether mapping an upper layer request message of 3GPP into a parameter indicating a PDU session characteristic is supported.

Optionally, the transceiving unit is further used for: acquiring, by a first network device, the capability information of the terminal device.

An implementation of the present application further provides a terminal device, which includes: a sending unit, used for sending capability information of the terminal device to a first network device; and a transceiving unit, used for receiving the policy information of the terminal device sent by the first network device.

Optionally, the capability information includes at least one of the following: a Permanent Equipment Identifier (PEI), a voice support capability of the terminal device, a Radio Frequency Selection Priority (RFSP) parameter of the terminal device, Single-Network Slice Selection Assistance Information (S-NSSAI) reported by the terminal device, whether an operating system supports receiving and/or identifying a Data Network Name (DNN) parameter sent by an application layer, and whether mapping an upper layer request message of 3GPP into a parameter indicating a PDU session characteristic is supported.

In an implementation process, each act of the method implementations in the implementations of the present disclosure may be completed by an integrated logic circuit of hardware in the processor or an instruction in the form of software. More specifically, the acts of the method disclosed in connection with the implementations of the present disclosure may be directly embodied as accomplishment through the execution of a hardware decoding processor or accomplishment through the execution in the combination of hardware and software modules in the decoding processor. Software modules may be located in a typical storage medium in the art, such as, a random access memory (RAM), a flash memory, a read-only memory, a programmable read-only memory, an electrical erasable programmable memory, or a register. The storage medium is located in the memory, and the processor reads the information in the memory and completes the acts of the above method in combination with its hardware.

It should be understood that the processor mentioned in implementations of the present disclosure may be an integrated circuit chip with a capability of signal processing. The processor can implement or execute the methods, acts or logical diagrams disclosed in the implementations of the present disclosure. For example, the above processor may be a general purpose processor, a digital signal processor (DSP), an application specific integrated circuit (ASIC), a field programmable gate array (FPGA) or other programmable logic devices, a transistor logic device, or a discrete hardware component, or the like. Furthermore, the general purpose processor may be a microprocessor or the processor may be any conventional processor or the like.

In addition, the memory mentioned in the implementations of the present disclosure may be a volatile memory or non-volatile memory, or may include both volatile and non-volatile memories. The non-transitory memory may be a read-only memory (ROM), a programmable ROM (PROM), an erasable PROM (EPROM), an electrically erasable EPROM (EEPROM), or a flash memory. The volatile memory may be a Random Access Memory (RAM) which serves as an external cache. It should be understood that, the foregoing memory is illustrative and should not be construed as limiting. For example, the memory in the implementations of the present disclosure may be a Static RAM (SRAM), Dynamic RAM (DRAM), Synchronous DRAM (SDRAM), Double Data Rate SDRAM (DDR SDRAM), Enhanced SDRAM (ESDRAM), Synch link DRAM (SLDRAM), Direct Rambus RAM (DR RAM), or the like. That is, memories in the systems and methods described in this document are intended to include, but not limited to, these and any other suitable types of memories.

Finally, it should be noted that the terms used in the implementations of the present disclosure and the appended claims are for the purpose of describing specific implementations only and are not intended to limit the implementations of the present disclosure.

For example, as used in the implementations of the present disclosure and the appended claims, the singular forms "a", "said", "the forgoing" and "the" include plural referents unless the context clearly dictates something else.

For another example, the term "first identifier" may be used in an implementation of the present disclosure, but these identifiers should not be limited to these terms. These terms are only used for distinguishing the identifiers from each other.

For another example, depending on the context, the word "when" as used herein may be interpreted as "if" or "whether" or "while" or "in response to a determination of/that" or "in response to a detection of/that". Similarly, depending on the context, the phrase "if determining" or "if detecting (a stated condition or event)" may be interpreted as "when . . . is determined" or "in response to a determination" or "when (stated condition or event) is detected" or "in response to a detection of (stated condition or event)".

Those of ordinary skill in the art will recognize that various example units and algorithm acts described in connection with the implementations disclosed herein may be implemented in electronic hardware, or in a combination of computer software and electronic hardware. Whether these functions are implemented in hardware or software depends on a specific application and design constraint of the technical solution. One skilled in the art may use different methods to implement the described functions for each particular application, but such implementation mode should not be considered to be beyond the scope of implementations of the present disclosure.

Those skilled in the art may clearly understand that for convenience and conciseness of description, specific working processes of the system, device and unit described above may refer to the corresponding processes in the aforementioned implementations of methods, and details are not described here again.

In several implementations provided by the present disclosure, it should be understood that the disclosed systems, devices and methods may be implemented in other ways. For example, the device implementations described above are only illustrative, for example, the division of the units is only a logical function division, and there may be other division modes in an actual implementation mode, for example, multiple units or components may be combined or integrated into another system, or some features may be ignored or not executed. On the other hand, the mutual coupling or direct coupling or communication connection between each other shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Parts or all of the units can be selected according to actual needs to achieve the purpose of the implementations of the present disclosure.

In addition, various functional units in the implementations of the present disclosure may be integrated in one processing unit, or various units may be presented separately in a physical way, or two or more units may be integrated into one unit.

The function units may be stored in a computer readable storage medium if realized in a form of software functional units and sold or used as a separate product. Based on this understanding, the technical solutions of the implementations of the present disclosure, in essence, or the part contributing to the related art, or the part of the technical solutions, may be embodied in the form of a software product stored in a storage medium, including several instructions for causing a computer device (which may be a personal computer, a server, or a network device, etc.) to perform all or parts of the acts of the methods described in various implementations of the present disclosure. The aforementioned storage medium includes a medium capable of storing program codes, such as, a U disk, a mobile hard disk, a read-only memory (ROM), a magnetic disk or an optical disk, etc.

What are described above are merely the specific implementation modes of the implementations of the present disclosure, but the protection scope of the implementations of the present disclosure is not limited thereto. Any change or substation that can be easily conceived by a person skilled in the art within the technical scope disclosed by the implementations of the present disclosure shall be included within the protection scope of the implementations of the present disclosure. Therefore, the scope of protection of the implementations of the present disclosure should be subject to the scope of protection of the claims.

What is claimed is:

1. A network device, comprising:
   a processor configured to:
   determine whether to update policy information of a terminal device after acquiring a Policy Section Identifier (PSI) list of the terminal device, wherein User Equipment (UE) policy is divided into different policy sections, wherein a PSI in the PSI list is used to identify a policy section, wherein the PSI comprises a Public Land Mobile Network (PLMN) identifier and a first identifier, and wherein the PLMN identifier and the first identifier are used to identify the policy section;
   update the policy information of the terminal device in a condition of determining to update a policy of the terminal device; and
   send at least part of the policy information to the terminal device according to the capability information of the terminal device.

2. The network device of claim 1, wherein the processor is further configured to send policy information corresponding to a subscriber identifier of the terminal device currently used to the terminal device.

3. The network device of claim 2, wherein the subscriber identifier comprises at least one of a Subscriber Private Identifier (SUPI) or a Subscriber Concealed Identifier (SUCI).

4. The network device of claim 1, wherein the processor is further configured to:
   update periodically the policy information of the terminal device.

5. The network device of claim 1, wherein the processor is further configured to:
   update at least part of the policy information to the terminal device according to the capability information of the terminal device.

6. The network device of claim 1, wherein the capability information comprises at least one of the following:
   a Permanent Equipment Identifier (PEI), a voice support capability of the terminal device, a Radio Frequency Selection Priority (RFSP) parameter of the terminal device, Single-Network Slice Selection Assistance Information (S-NSSAI) reported by the terminal device, whether an operating system supports at least one of receiving or identifying a Data Network Name (DNN) parameter sent by an application layer, or whether mapping an upper layer request message of 3GPP into a parameter indicating a PDU session characteristic is supported.

7. The network device of claim 1, wherein the processor is further configured to:
   acquire the capability information of the terminal device before updating the policy information of the terminal device according to the capability information of the terminal device.

8. The network device of claim 1, wherein the network device is a Policy Control Function (PCF).

9. A method of wireless communication, comprising:
   determining, by a network device, whether to update policy information of a terminal device after acquiring a Policy Section Identifier (PSI) list of the terminal device, wherein UE policy is divided into different policy sections, wherein a PSI in the PSI list is used to identify a policy section, wherein the PSI comprises a Public Land Mobile Network (PLMN) identifier and a first identifier, and wherein the PLMN identifier and the first identifier are used to identify the policy section; and
   updating, by the network device, the policy information of the terminal device in a condition that the network device determines to update the policy of the terminal device, comprising:
     sending, by the network device, at least part of the policy information to the terminal device according to the capability information of the terminal device.

10. The method of claim 9, wherein determining to update the policy information of the terminal device comprises:
    sending, by the network device, policy information corresponding to a subscriber identifier of the terminal device currently used to the terminal device.

11. The method of claim 10, wherein the subscriber identifier comprises at least one of a Subscriber Private Identifier (SUPI) or a Subscriber Concealed Identifier (SUCI).

12. The method of claim 9, wherein updating the policy information of the terminal device comprises:
    updating periodically, by the network device, the policy information of the terminal device.

13. The method of claim 9, wherein updating the policy of the terminal device further comprises:
    updating, by the network device, at least part of the policy information to the terminal device according to the capability information of the terminal device.

14. The method of claim 9, wherein the capability information comprises at least one of the following:
a Permanent Equipment Identifier (PEI), a voice support capability of the terminal device, a Radio Frequency Selection Priority (RFSP) parameter of the terminal device, Single-Network Slice Selection Assistance Information (S-NSSAI) reported by the terminal device, whether an operating system supports at least one of receiving or identifying a Data Network Name (DNN) parameter sent by an application layer, or whether mapping an upper layer request message of 3GPP into a parameter indicating a PDU session characteristic is supported.

15. The method of claim 9, further comprising:
before the network device updates the policy information of the terminal device according to the capability information of the terminal device,
acquiring, by the network device, the capability information of the terminal device.

16. The method of claim 9, wherein the network device is a Policy Control Function (PCF).

17. A method of wireless communication, comprising:
sending, by a terminal device, a registration request message to a network device, wherein a Policy Section Identifier (PSI) list is not carried or the PSI list is null in the registration request message, wherein UE policy is divided into different policy section, wherein a PSI in the PSI list is used to identify a policy section, wherein the PSI comprises a Public Land Mobile Network (PLMN) identifier and a first identifier, and wherein the PLMN identifier and the first identifier are used to identify the policy section; and
receiving, by the terminal device, policy information sent by the network device, wherein the terminal device does not carry the PSI list or sets the PSI list to be null in an initial registration request message initiated in a condition that a Subscriber Identification Module (SIM) card is changed.

18. A terminal device, comprising:
a transceiver, configured to send a registration request message to a network device, wherein a Policy Section Identifier (PSI) list is not carried or the PSI list is null in the registration request message, wherein UE policy is divided into different policy section, wherein a PSI in the PSI list is used to identify a policy section, wherein the PSI comprises a Public Land Mobile Network (PLMN) identifier and a first identifier, and wherein the PLMN identifier and the first identifier are used to identify the policy section;
wherein the transceiver is further configured to receive policy information sent by the network device, wherein the terminal device does not carry a PSI list or sets the PSI list to be null in an initial registration request message initiated in a condition that a Subscriber Identification Module (SIM) card is changed.

* * * * *